US011234219B2

(12) United States Patent
Mondal et al.

(10) Patent No.: US 11,234,219 B2
(45) Date of Patent: Jan. 25, 2022

(54) DISCOVERY REFERENCE SIGNAL AND CONTROL RESOURCE SET MULTIPLEXING

(71) Applicant: Intel Corporation, Santa Clara, CA (US)

(72) Inventors: Bishwarup Mondal, San Ramon, CA (US); Prerana Rane, Santa Clara, CA (US); Yongjun Kwak, Portland, OR (US); Debdeep Chatterjee, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 14 days.

(21) Appl. No.: 16/739,791

(22) Filed: Jan. 10, 2020

(65) Prior Publication Data

US 2020/0154424 A1 May 14, 2020

Related U.S. Application Data

(60) Provisional application No. 62/791,692, filed on Jan. 11, 2019, provisional application No. 62/806,566, filed on Feb. 15, 2019.

(51) Int. Cl.
*H04W 72/04* (2009.01)
*H04L 5/00* (2006.01)
*H04L 27/26* (2006.01)

(52) U.S. Cl.
CPC ....... *H04W 72/0406* (2013.01); *H04L 5/0048* (2013.01); *H04L 5/0053* (2013.01); *H04L 27/261* (2013.01)

(58) Field of Classification Search
CPC . H04L 27/2662; H04L 5/0048; H04L 5/0053; H04L 27/261; H04L 27/2613; H04L 5/00; H04L 27/26; H04W 72/0406; H04W 72/04
USPC .......................................................... 370/329
See application file for complete search history.

(56) References Cited

U.S. PATENT DOCUMENTS

| | | | | |
|---|---|---|---|---|
| 10,582,486 | B2* | 3/2020 | Nam | H04W 24/08 |
| 10,609,713 | B2* | 3/2020 | Lin | H04W 72/0446 |
| 10,708,028 | B2* | 7/2020 | Nam | H04W 72/0446 |
| 10,791,550 | B2* | 9/2020 | Ko | H04W 48/12 |
| 10,945,253 | B2* | 3/2021 | Ko | H04L 27/2666 |
| 10,973,031 | B2* | 4/2021 | Da | H04L 5/0044 |
| 10,993,248 | B2* | 4/2021 | Ly | H04W 56/001 |
| 2018/0324678 | A1* | 11/2018 | Chen | H04W 48/16 |
| 2019/0200307 | A1* | 6/2019 | Si | H04W 72/042 |
| 2019/0306832 | A1* | 10/2019 | Si | H04W 72/005 |
| 2020/0205138 | A1* | 6/2020 | Nam | H04W 56/001 |
| 2020/0244530 | A1* | 7/2020 | Lin | H04W 48/12 |
| 2020/0252939 | A1* | 8/2020 | Lin | H04W 72/0446 |
| 2020/0404601 | A1* | 12/2020 | Lin | H04L 27/2673 |

(Continued)

OTHER PUBLICATIONS

3GPP, "Technical Specification Group Radio Access Network; NR; Physical channels and modulation (Release 15)," 3GPP TS 38.211 V15.3.0 (Sep. 2018), 5G, 96 pages.

*Primary Examiner* — Man U Phan
(74) *Attorney, Agent, or Firm* — Schwabe, Williamson & Wyatt, P.C.

(57) ABSTRACT

Embodiments of the present disclosure describe methods and apparatuses for multiplexing control information of discovery reference signals.

18 Claims, 11 Drawing Sheets

(56) References Cited

U.S. PATENT DOCUMENTS

2021/0022116 A1* 1/2021 Lee .................. H04W 72/02
2021/0058931 A1* 2/2021 Da .................. H04L 5/0028

* cited by examiner

DISCOVERY REFERENCE SIGNAL AND CONTROL RESOURCE SET MULTIPLEXING

RELATED APPLICATION

This application claims priority to U.S. Provisional Application No. 62/791,692 filed Jan. 11, 2019 and to U.S. Provisional Application No. 62/806,566 filed Feb. 15, 2019. The specifications of said applications are hereby incorporated by reference in their entireties.

FIELD

Embodiments of the present disclosure generally relate to the field of wireless communication, and more particularly, to apparatuses, systems, and methods for reference and control signaling in wireless networks.

BACKGROUND

Release 15 of Third Generation Partnership Project ("3GPP") new radio ("NR") specifications provide three multiplexing patterns for multiplexing remaining minimum system information-control resource set (RMSI-CORESET) and synchronization signal (SS)/physical broadcast channel (PBCH) blocks.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

In the following detailed description, reference is made to the accompanying drawings, which form a part hereof wherein like numerals designate like parts throughout, and in which is shown by way of illustration embodiments that may be practiced. It is to be understood that other embodiments may be utilized and structural or logical changes may be made without departing from the scope of the present disclosure.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed or described operations may be omitted in additional embodiments.

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

For the purposes of the present disclosure, the phrases "A or B," "A and/or B," and "A/B" mean (A), (B), or (A and B).

Figure 1:
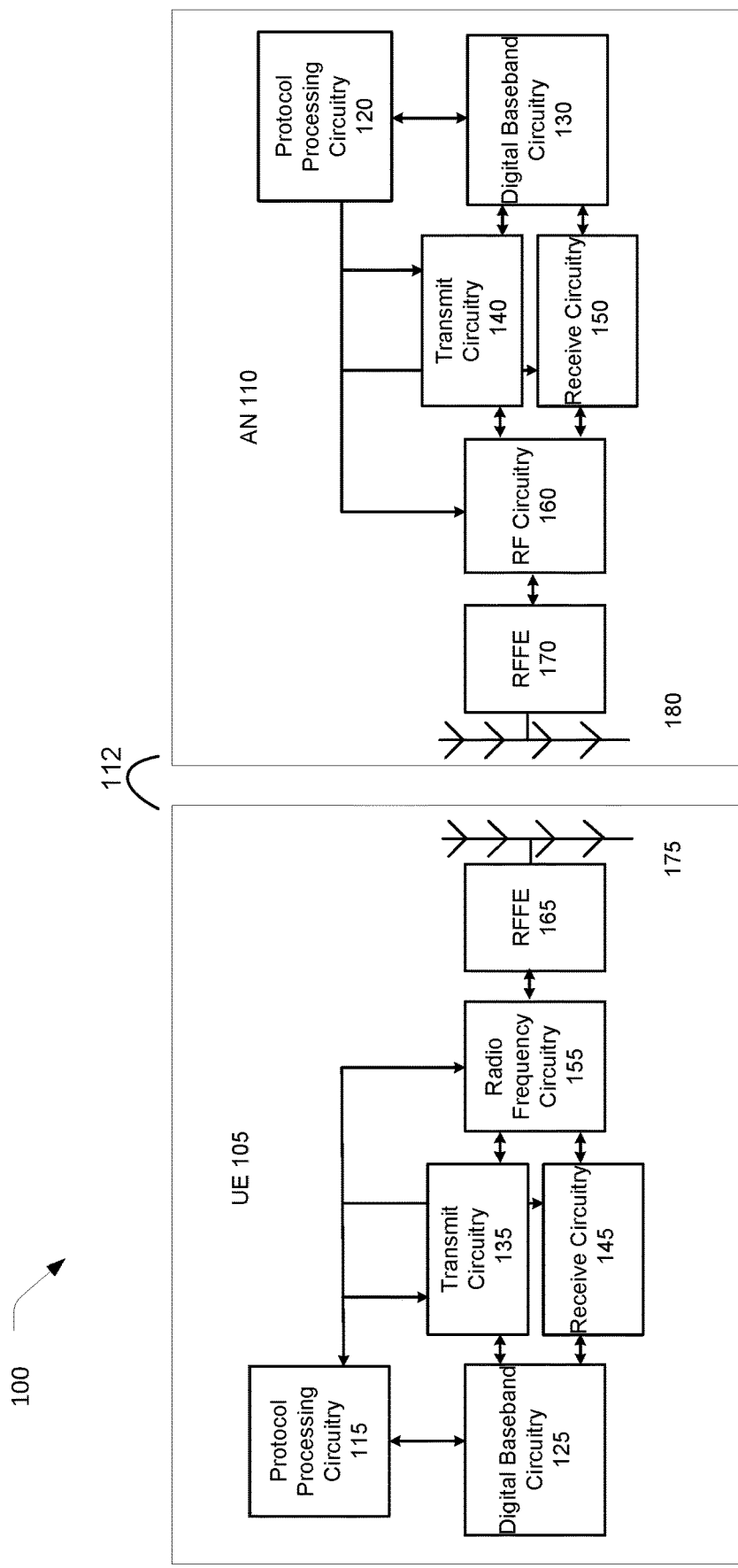
FIG. 1 illustrates a network in accordance with some embodiments.

FIG. 1 schematically illustrates an example wireless network 100 (hereinafter "network 100") in accordance with various embodiments herein. The network 100 may include a UE 105 in wireless communication with an access node (AN) 110. In some embodiments, the network 100 may be a 3GPP 5G/NR network. The UE 105 may be configured to connect, for example, to be communicatively coupled, with the AN 110 via connection 112. In this example, the connection 112 is illustrated as an air interface to enable communicative coupling, and can be consistent with cellular communications protocols such as an LTE protocol, a 5G NR protocol operating at mmWave and sub-6 GHz, a Global System for Mobile Communications (GSM) protocol, a code-division multiple access (CDMA) network protocol, a Push-to-Talk (PTT) protocol, and the like.

The UE 105 may be any mobile or non-mobile computing devices, such as a smartphone, personal data assistant (PDA), pager, laptop computer, desktop computer, wireless handset, customer premises equipment (CPE), fixed wireless access (FWA) device, vehicle mounted UE or any computing device including a wireless communications interface. In some embodiments, the UE 105 can comprise an Internet of Things (IoT) UE, which can comprise a network access layer designed for low-power IoT applications utilizing short-lived UE connections. An IoT UE can utilize technologies such as narrowband IoT (NB-IoT), machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An NB-IoT/MTC network describes interconnecting NB-IoT/MTC UEs, which may include uniquely identifiable embedded computing devices (within the Internet infrastructure), with short-lived connections. The NB-IoT/MTC UEs may execute background applications (for example, keep-alive message, status updates, location related services, etc.).

The AN 110 can enable or terminate the connection 112. The AN 110 can be referred to as a base station (BS), NodeB, evolved-NodeB (eNB), Next-Generation NodeB (gNB or ng-gNB), NG-RAN node, cell, serving cell, neighbor cell, and so forth, and can comprise ground stations (for example, terrestrial access points) or satellite stations providing coverage within a geographic area.

The AN 110 can be the first point of contact for the UE 105. In some embodiments, the AN 110 can fulfill various logical functions including, but not limited to, radio network controller (RNC) functions such as radio bearer management, uplink and downlink dynamic radio resource management and data packet scheduling, and mobility management.

The UE 105 may include protocol processing circuitry 115, which may implement one or more of layer operations related to medium access control (MAC), radio link control (RLC), packet data convergence protocol (PDCP), radio resource control (RRC) and non-access stratum (NAS). The protocol processing circuitry 115 may include one or more processing cores (not shown) to execute instructions and one or more memory structures (not shown) to store program and data information.

The UE 105 may further include digital baseband circuitry 125, which may implement physical layer (PHY) functions including one or more of hybrid automatic repeat request-acknowledgment (HARQ-ACK) functions, scrambling and/or descrambling, coding and/or decoding, layer mapping and/or de-mapping, modulation symbol mapping, received symbol and/or bit metric determination, multi-antenna port pre-coding and/or decoding, which may include one or more of space-time, space-frequency or spatial coding, reference signal generation and/or detection, preamble sequence generation and/or decoding, synchronization sequence generation and/or detection, control channel signal blind decoding, and other related functions.

The UE 105 may further include transmit circuitry 135, receive circuitry 145, radio frequency (RF) circuitry 155, and RF front end (RFFE) 165, which may include or connect to one or more antenna panels 175.

As used herein, the term "circuitry" may refer to, is part of, or includes hardware components such as an electronic circuit, a logic circuit, a processor (shared, dedicated, or group) and/or memory (shared, dedicated, or group), an Application Specific Integrated Circuit (ASIC), a field-programmable device (FPD) (e.g., a field-programmable gate array (FPGA), a programmable logic device (PLD), a complex PLD (CPLD), a high-capacity PLD (HCPLD), a structured ASIC, or a programmable system on chip (SoC)), digital signal processors (DSPs), etc., that are configured to provide the described functionality. In some embodiments, the circuitry may execute one or more software or firmware programs to provide at least some of the described functionality. In addition, the term "circuitry" may also refer to a combination of one or more hardware elements (or a combination of circuits used in an electrical or electronic system) with the program code used to carry out the functionality of that program code. In these embodiments, the combination of hardware elements and program code may be referred to as a particular type of circuitry.

In some embodiments, RF circuitry 155 may include multiple parallel RF chains or branches for one or more of transmit or receive functions; each chain or branch may be coupled with one antenna panel 175.

In some embodiments, the protocol processing circuitry 115 may include one or more instances of control circuitry (not shown) to provide control functions for the digital baseband circuitry 125 (or simply, "baseband circuitry 125"), transmit circuitry 135, receive circuitry 145, radio frequency circuitry 155, RFFE 165, and one or more antenna panels 175.

A UE reception may be established by and via the one or more antenna panels 175, RFFE 165, RF circuitry 155, receive circuitry 145, digital baseband circuitry 125, and protocol processing circuitry 115. The one or more antenna panels 175 may receive a transmission from the AN 110 by receive-beamforming signals received by a plurality of antennas/antenna elements of the one or more antenna panels 175.

The transmission from the AN 110 may be transmit-beamformed by antennas of the AN 110. In some embodiments, the baseband circuitry 125 may contain both the transmit circuitry 135 and the receive circuitry 145. In other embodiments, the baseband circuitry 125 may be implemented in separate chips or modules, for example, one chip including the transmit circuitry 135 and another chip including the receive circuitry 145.

Similar to the UE 105, the AN 110 may include protocol processing circuitry 120, digital baseband circuitry 130 (or simply, "baseband circuitry 130"), transmit circuitry 140, receive circuitry 150, RF circuitry 160, RFFE 170, and one or more antenna panels 180.

A cell transmission may be established by and via the protocol processing circuitry 120, digital baseband circuitry 130, transmit circuitry 140, RF circuitry 160, RFFE 170, and one or more antenna panels 180. The transmission components of the UE 105 may apply a spatial filter to the data to be transmitted to form a transmit beam emitted by the antenna elements of the one or more antenna panels 180.

The AN 110 may transmit control information to the UE 105 in one or more downlink control channels to facilitate initial access and beam management. The control information may include a synchronization signal block (SSB), which may include synchronization signals (for example, primary synchronization signal (PSS) and secondary synchronization signal (SSS)) and PBCH (including, for example, demodulation reference signal and payload).

During an initial beam sweeping operation, the AN 110 may send SSBs using different transmit beams. The UE 105 may select an SSB of the received SSBs based on, for example, signal strength measured by the UE 105. The UE 105 may determine an SSB index of the selected SSB based on PBCH. In particular, in accordance with some embodiments, a first part of the SSB index may be communicated by a parameter in the PBCH DMRS, and a second part of the SSB index may be communicated by the PBCH payload. The UE 105 may notify the AN 110 of the selected SSB using a physical random access channel (PRACH) process. The AN 110 may then use a transmit beam associated with the selected SSB for downlink transmissions until a subsequent beam sweeping operation.

After the initial beam sweeping operation, the UE 105 may monitor downlink transmissions for an SSB with the associated SSB index. The UE 105 may receive and process the selected SSB to facilitate processing of other control information that is transmitted with the same beam and, therefore, associated with the selected SSB. The other control information may include RMSI-CORESET.

In some embodiments, the UE 105 may process the SSB to obtain some system information that is carried by the PBCH. The PBCH payload may also include a numerology used for transmission of the RMSI-CORSET, which may be a set of physical resources in the physical downlink control channel (PDCCH) that carry the RMSI. The UE 105 may determine, based on the SSB, a monitoring window for an RMSI-CORESET associated with the SSB.

In Release-15 NR, the RMSI-CORESET is not co-located with an associated SSB. For example, an RMSI-CORESET for SSB-n may be located in symbol 0 of a slot; RMSI-CORESET for SSB-n+1 may be located in symbol 1 of the slot; SSB-n, which may include a 15 kHz subcarrier spacing (SCS), may be located in symbols 2-5 of the slot; and SSB-n+1, which may also have a 15 kHz SCS, may be located in symbols 8-11 of the slot.

If a listen-before-talk (LBT) fails before symbol 0, then the RMSI-CORESET associated with SSB n+1 cannot be transmitted even if LBT succeeds before SSB n+1. The next LBT attempt will need to be made in the next slot. This may reduce the number of transmission opportunities for a discovery reference signal (DRS) signal of which the SSBs/RMSI-CORESETs may be constituent parts. Embodiments of the present disclosure address this situation by multiplexing an RMSI-CORESET adjacent to its associated SSB.

Figure 2:
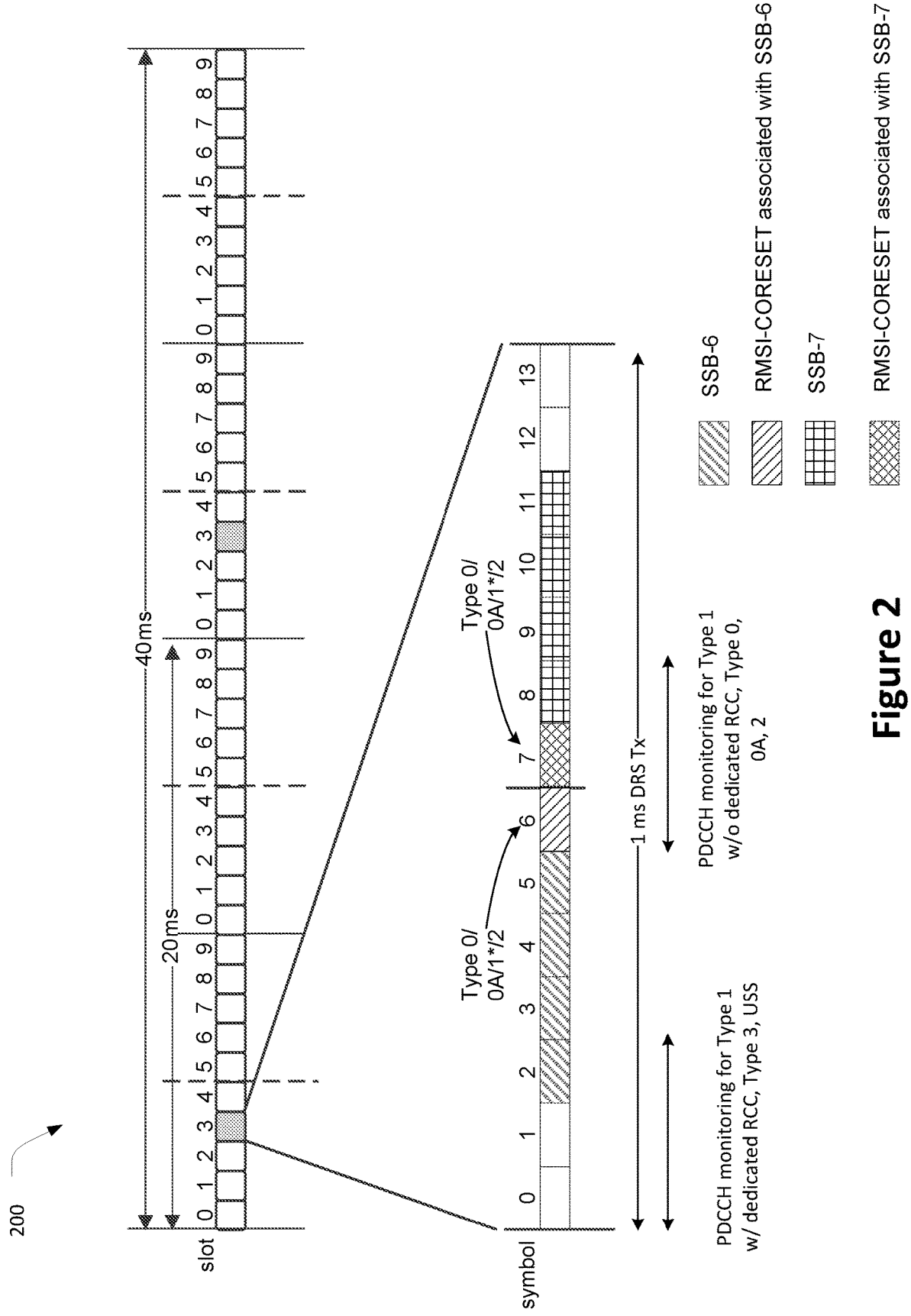
FIG. 2 illustrates a downlink channel with a 15 kHz subcarrier spacing in accordance with some embodiments.

FIG. 2 illustrates a downlink channel 200 with a first RMSI-CORESET multiplexing pattern in accordance with some embodiments.

The downlink channel 200 is shown with an exploded view of slot 3, which includes a 1 ms DRS transmission opportunity. The DRS transmission opportunity may be the extent the AN 110 may acquire the spectrum using a LBT operation. The DRS may be provided with prioritized access to spectrum by having a relatively short LBT, and transmission opportunities limited to 1 ms with a 20 ms periodicity. This may be different in different embodiments.

The downlink channel 100 of FIG. 2 illustrates the SSB being located adjacent to its associated RMSI-CORESET. For example, SSB-6 may be transmitted in symbols 2-5 of the slot and the RMSI-CORESET associated with the SSB-6 may be transmitted in symbol 6 of the slot. Similarly, RMSI-CORESET associated with SSB-7 may be transmitted in symbol 7 of the slot and SSB-7 may be transmitted in symbols 8-11. The SSBs may each have a 15 kHz SCS, which may be the same or different from an SCS of a slot in which the SSBs are inserted.

The RMSI-CORESETs transmitted in symbols 6 and 7 may be associated with a type 0/0A/1*/2 search spaces.

In some embodiments, the RMSI-CORESET location is chosen to align with Release 15 UE capability 3-1 for basic downlink control channel. Such a UE may be able to monitor PDCCH from any of Type 1-PDCCH common search space (CSS) without dedicated radio resource control (RRC) configuration, or Types 0, 0A, or 2 PDCCH-CSS configurations within a single span of three consecutive OFDM symbols within a slot.

Placing the RMSI-CORESET adjacent to its associated SSB may provide more transmission opportunities in some instances. For example, in the event an LBT that occurs before symbol 0 fails, the AN 110 may still be able to perform an LBT before symbol 7 and, if successful, transmit both the SSB-7 and its associated RMSI-CORESET for processing by the UE 105.

In some embodiments, it may be advantageous to locate consecutive RMSI-CORESETs in adjacent symbols as shown in FIG. 2 to prevent a gap in the downlink transmissions. This may avoid, in some situations, another device attempting to gain access to the spectrum within the gap.

Figure 3:
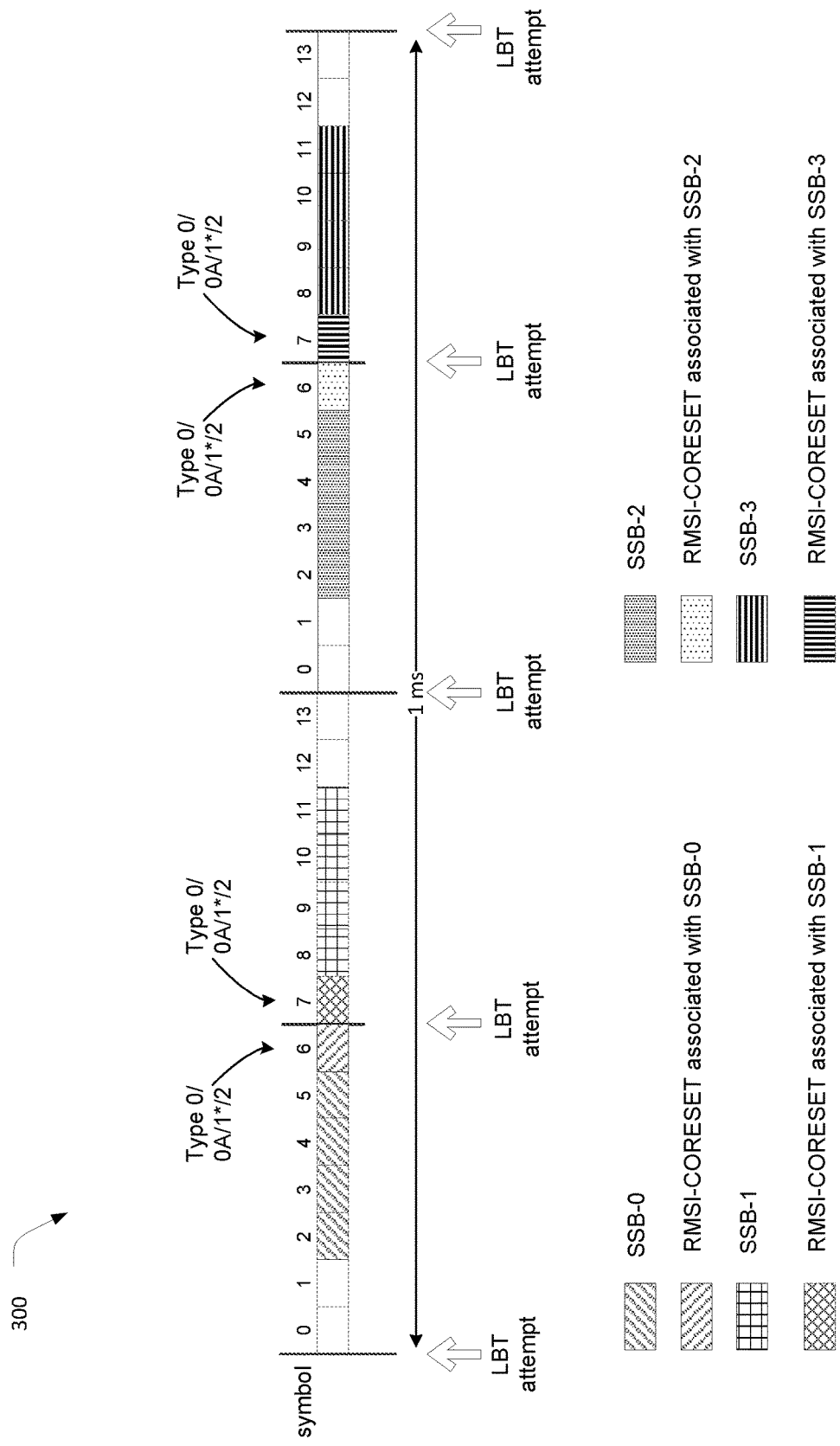
FIG. 3 illustrates a downlink channel with a 30 kHz subcarrier spacing in accordance with some embodiments.

FIG. 3 illustrates a downlink channel 300 with a second RMSI-CORESET multiplexing pattern in accordance with some embodiments. The downlink channel 300 may correspond to a 30 kHz SCS for the SSBs.

The multiplexing pattern shown provides SSB-0 and SSB-1 and their associated RMSI-CORESETs transmitted in a first slot, and SSB-2 and SSB-3 and their associated RMSI-CORESETs transmitted in a second slot. In particular, SSB-0 is transmitted on OFDM symbols 2-5 of slot 1 and the RMSI-CORESET associated with SSB-0 is transmitted on OFDM symbol 6 of slot 1. Similarly, SSB-1 is transmitted on OFDM symbols 8-11 of slot 2 and the RMSI-CORESET associated with SSB-1 is transmitted on OFDM symbol 7 of slot 2.

The RMSI-CORESETs transmitted in symbols 6 and 7 of slots 1 and 2 may be associated with a type 0/0A/1*/2 search spaces.

In some embodiments, the RMSI-CORESET locations can be described with respect to the index of their associated SSBs. For example, the relative position of an RMSI-CORESET with respect to its associated SSB may be provided in Table 1 below.

TABLE 1

| RMSI-CORESET Relative Position with Respect to Associated SSB | |
|---|---|
| SSB-0 | OFDM Symbol after SSB |
| SSB-1 | OFDM Symbol before SSB |
| SSB-2 | OFDM Symbol after SSB |
| SSB-3 | OFDM Symbol before SSB |

As can be seen, the downlink channel 300 includes relative positioning of RMSI-CORESETs and associated SSBs consistent with Table 1. Relatively positioning of RMSI-CORESET/SSBs in downlink channels including other SCSs may be performed in similar manners.

Figure 4:
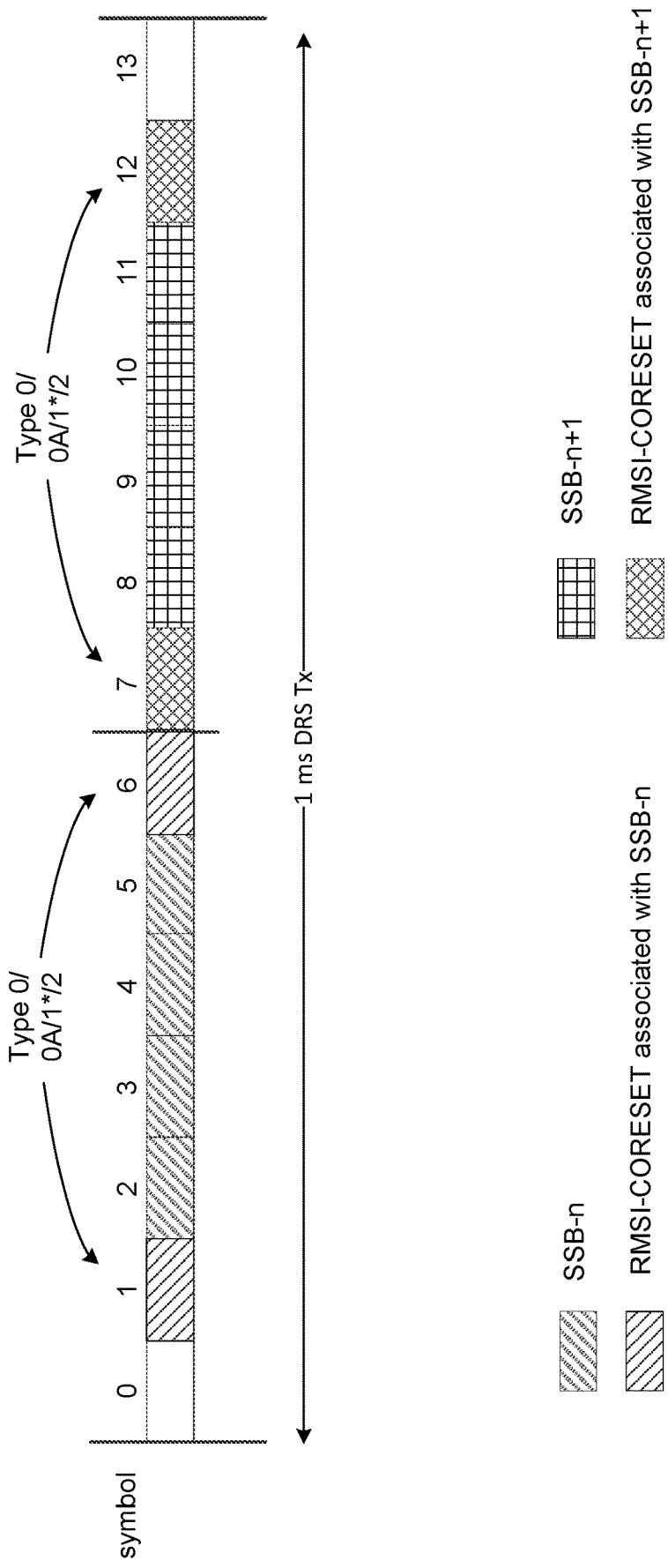
FIG. 4 illustrates a downlink channel with a flexible positioning of control resource set with a 15 kHz subcarrier spacing in accordance with some embodiments.

FIG. 4 illustrates a downlink channel 400 with a flexible positioning of RMSI-CORESET with respect to their associated SSBs in accordance with some embodiments. The downlink channel 400 may correspond to a 15 kHz SCS for the SSBs.

In some embodiments, a plurality RMSI-CORESET patterns may be defined by specification. The specification may be, for example, a 3GPP Technical Specification. The AN 110 may indicate, to the UE 105, which of the plurality of RMSI-CORESET patterns is used by providing an indication in a PBCH payload. The UE 105 may use the indication and information related to the plurality of patterns stored in memory of the UE 105 to determine which pattern is being used to transmit the control information.

With reference to FIG. 4, a plurality of RMSI-CORESET patterns may be defined in which the RMI-CORESETs are transmitted either before or after their associated SSBs. For example, the RMSI-CORESET associated with SSB-n may be transmitted in OFDM symbol 1 or 6 (whereas SSB-n is transmitted in symbols 2-5); and RMSI-CORESET associated with SSB-n+1 may be transmitted in OFDM symbol 7 or 12 (whereas SSB-n+1 is transmitted in OFDM symbols 8-11).

The decision upon which pattern to use may be based on various factors including, for example, UE capabilities, other downlink transmissions, spectrum congestions, etc. For example, if the AN 110 finds it desirable to transmit a channel state information reference signal in OFDM symbols 6 and 7, the AN 110 may decide to use a multiplexing pattern in which the RMSI-CORESET associated with SSB-n is transmitted in symbol 1 and the RMSI-CORESET associated with SSB-n+1 is transmitted in OFDM symbol 12.

Figure 5:
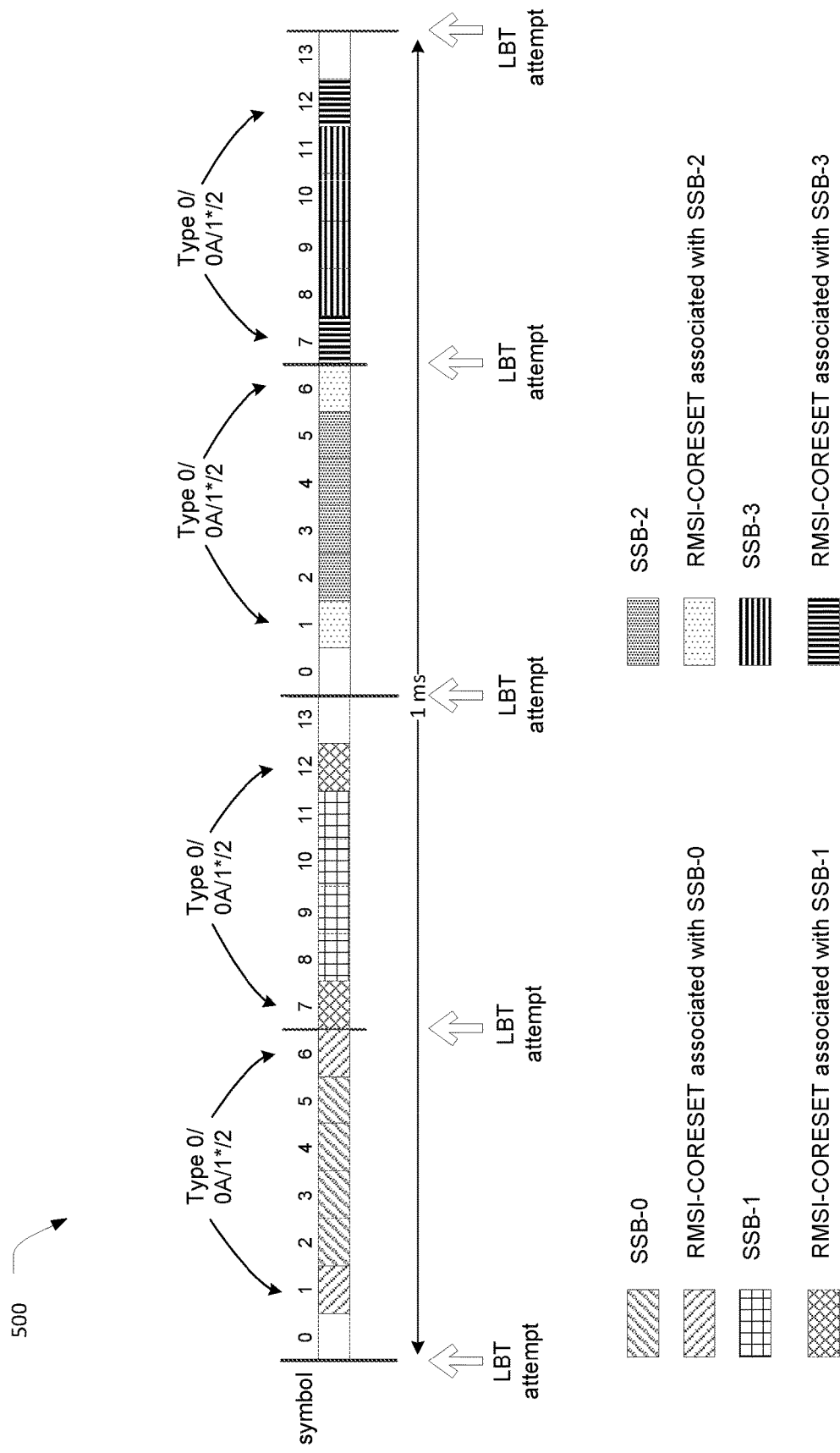
FIG. 5 illustrates a downlink channel with a flexible positioning of control resource set with a 30 kHz subcarrier spacing in accordance with some embodiments.

FIG. 5 illustrates a downlink channel 500 with a flexible positioning of RMSI-CORESET with respect to their associated SSBs in accordance with some embodiments. The downlink channel 500 may correspond to a 30 kHz SCS for the SSBs.

Similar to downlink channel 400, downlink channel 500 illustrates a plurality of RMSI-CORESET patterns defined in which the RMI-CORESETs are transmitted either before or after their associated SSBs. For example, the RMSI-CORESET associated with SSB-1 may be transmitted in OFDM symbol 1 or 6 of slot 1 (whereas SSB-1 is transmitted in symbols 2-5 of slot 1); RMSI-CORESET associated with SSB-2 may be transmitted in OFDM symbol 7 or 12 of slot 1 (whereas SSB-2 is transmitted in OFDM symbols 8-11 of slot 1); the RMSI-CORESET associated with SSB-2 may be transmitted in OFDM symbol 1 or 6 of slot 2 (whereas SSB-2 is transmitted in symbols 2-5 of slot 2); RMSI-CORESET associated with SSB-3 may be transmitted in OFDM symbol 7 or 12 of slot 2 (whereas SSB-3 is transmitted in OFDM symbols 8-11 of slot 2).

As mentioned before if an RMSI-CORESET associated with a first SSB within a slot is placed before the first SSB (or some other cases) then a UE only capable of monitoring Type 0/0A/1*/2 search spaces that are contiguous will not be able to monitor NR-U system information. Therefore, some embodiments include a UE capability defined where a UE is able to monitor Type 0/0A/1*/2 search spaces within a slot that are discontiguous (for example, two sets of contiguous symbols within a slot).

In some embodiments, the UE 105 may provide the AN 110 with a capability parameter in one or more UE capability messages transmitted to the AN 110. The AN 110 may then use this information to determine which of a number of multiplexing patterns to use.

In some embodiments, placement of the SSB may address shift granularity between SSBs. Shift granularity may be a reasonable shortest time interval between two consecutive LBT attempts for DRS transmission. It may be up to implementation. For the purposes of intra-DRS accumulation for PSS/SSS detection and soft-combining for PBCH decoding, equal intervals (time samples) across different SSB locations may be desirable irrespective of the shift.

Consider, for example, an unequal spacing between symbols using a shift granularity of 0.5 slots. This may provide SSB-n in OFDM symbols 2-5 of slot 1, SSB-n+1 in OFDM symbols 8-11 in slot 1, and SSB-n+2 in symbols 2-5 of slot 2. Thus, there is a two-symbol spacing between SSB-n and SSB-n+1 and a three-symbol spacing between SSB-n+1 and SSB-n+2.

Figure 6:
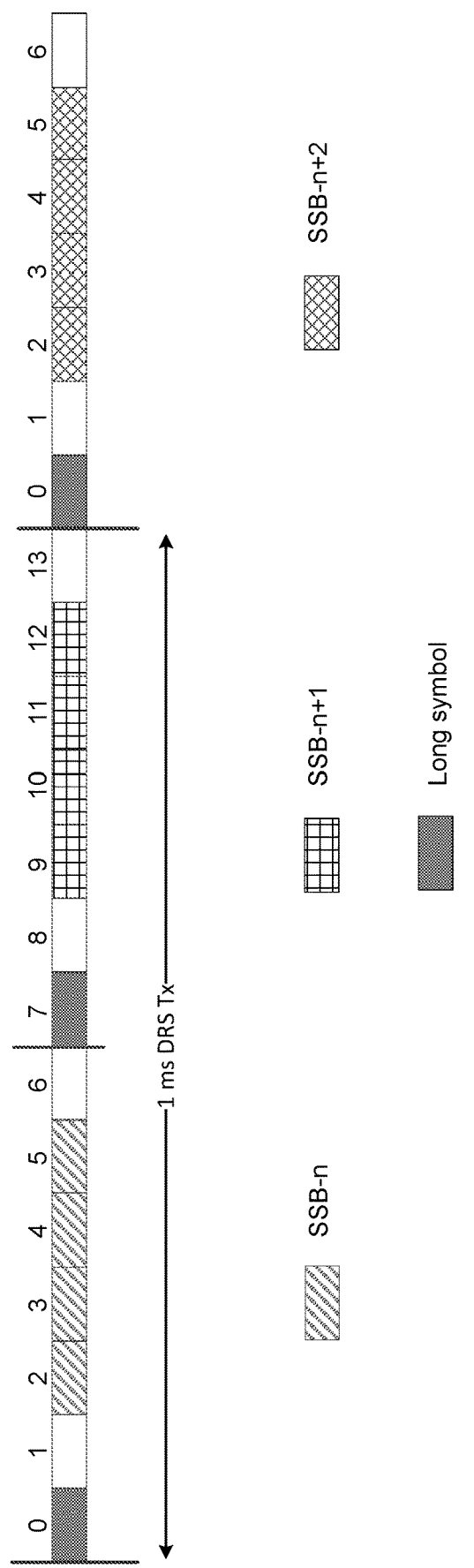
FIG. 6 illustrates a downlink channel with equal spacing between synchronization signal blocks in accordance with some embodiments.

In the case of 15 kHz, a modification of SSB locations can help to resolve this issue if a 0.5 slot granularity is required as shown in FIG. 6.

FIG. 6 illustrates a downlink channel 600 in which the SSBs are equally spaced in accordance with some embodiments. While the RMSI-CORESETs are not shown in the downlink channel 600, they may be located consistently with multiplexing patterns described in other embodiments or even patterns in which the RMSI-CORESETs are not adjacent to their associated SSBs.

As shown by the downlink channel 600, the SSBs are positioned in a manner that the inter-symbol distance (for example, number of OFDM symbols between consecutive SSBs) is consistently 3 symbols including 1 long symbol. Positioning the SSBs in this manner may facilitate intra-DRS accumulation for PSS/SSS detection and soft-combining for PBCH decoding as described above.

Figure 7:
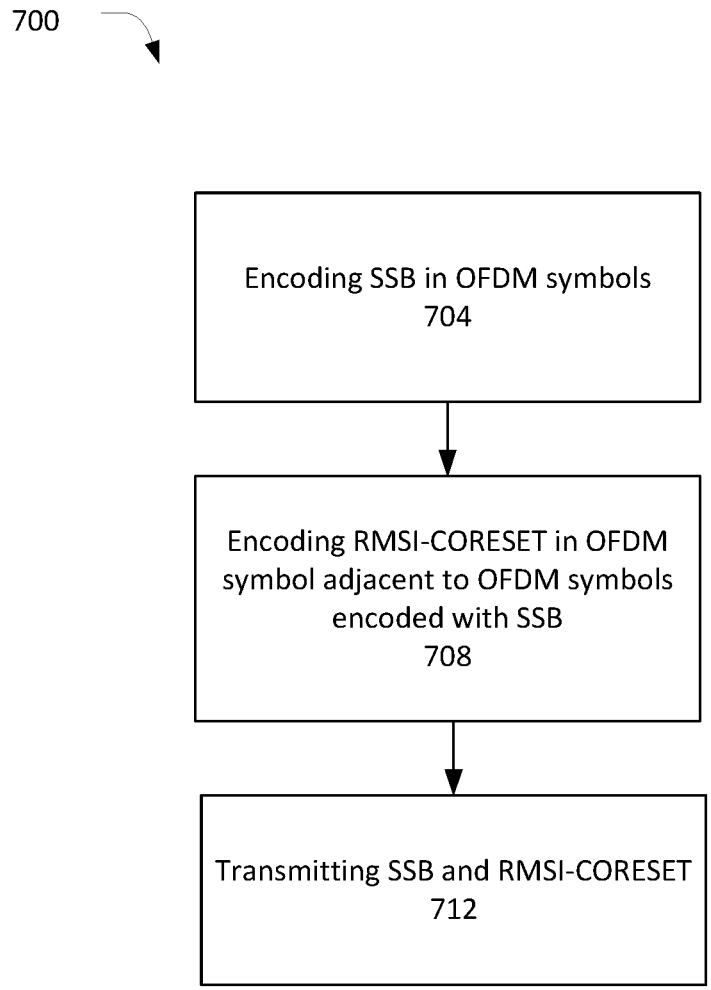
FIG. 7 illustrates an example operation flow/algorithmic structure in accordance with some embodiments.

FIG. 7 illustrates an operation flow/algorithmic structure 700 in accordance with some embodiments. The operation flow/algorithmic structure 700 may be performed by the AN 110 or components thereof. For example, the operation flow/algorithmic structure 700 may be performed by digital baseband circuitry 130 of the AN 110 described above with respect to FIG. 1.

The operation flow/algorithmic structure 700 may include, at 704, encoding SSB into OFDM symbols. In various embodiments, the SSB may include synchronization signals and PBCH. The SSB may be encoded into a plurality of adjacent OFDM symbols. In some embodiments, two SSBs may be encoded into a slot, one on four consecutive symbols in a first half of the slot and one on four consecutive symbols in the second half of the slot.

The SSB may be encoded with different SCS. In embodiments in which the SSB is encoded with a 15 kHz SCS, one slot (including two SSBs) may correspond to a 1 ms DRS transmission opportunity. In embodiments in which the SSB is encoded with a 30 kHz SCS, two slots (including four SSBs) may correspond to the 1 ms DRS transmission opportunity.

The operation flow/algorithmic structure 700 may further include, at 708, encoding RMSI-CORESET into an OFDM symbol adjacent to the OFDM symbols encoded with the SSB. The RMSI-CORESET may be associated with the SSB to which it is adjacent. The RMSI-CORESET may be associated with the SSB if they are both transmitted by the same beam or if the RMSI-CORESET includes system information that complements system information included in the SSB.

The operation flow/algorithmic structure 700 may further include, at 712, transmitting the SSB and the RMSI-CORESET. The transmission of the SSB in the RMSI-CORESET may be done with the same transmit beam.

Figure 8:
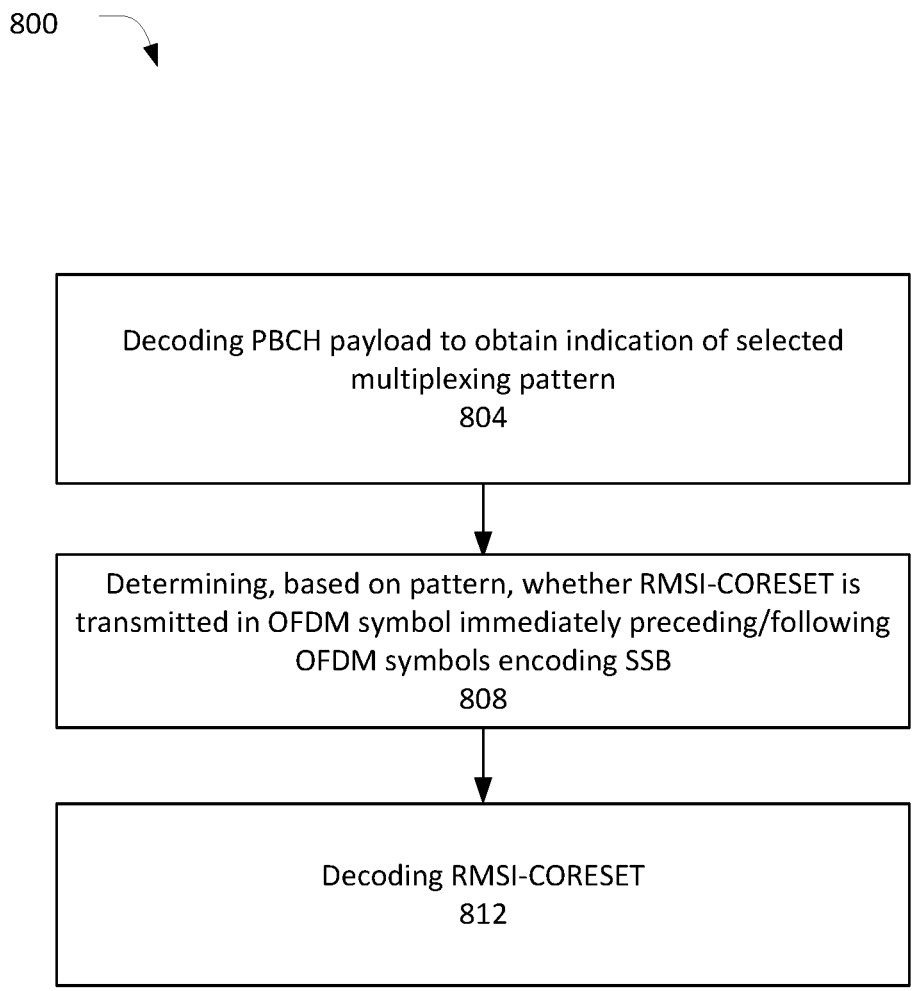
FIG. 8 illustrates an example operation flow/algorithmic structure in accordance with some embodiments.

FIG. 8 illustrates an operation flow/algorithmic structure 800 in accordance with some embodiments. The operation flow/algorithmic structure 800 may be performed by the UE 105 or components thereof. For example, the operation flow/algorithmic structure 800 may be performed by digital baseband circuitry 125 of the UE 105 described above with respect to FIG. 1.

The operation flow/algorithmic structure 800 may include, at 804, decoding a PBCH payload to obtain an indication of a selected multiplexing pattern. The PBCH payload may be part of the SSB received by the UE 105. The indication in the PBCH payload provide, for example, an index of a multiplexing pattern of a plurality of multiplexing patterns preconfigured at the UE 105 and stored in memory thereof. In some embodiments, the indication of the selected multiplexing pattern may correspond to a table of values that define RMSI-CORESET relative position with respect to an index of an SSB, similar to Table 1.

The operation flow/algorithmic structure 800 may further include, at 808, determining, based on the selected multiplexing pattern, whether an RMSI-CORESET is transmitted in an OFDM symbol immediately preceding or immediately following OFDM symbols encoding the SSB.

The operation flow/algorithmic structure 800 may further include, at 812, decoding the RMSI-CORESET. The decoding of the RMSI-CORESET may be based on information included in the associated SSB. For example, the decoding of the RMSI-CORESET may be based on synchronization signals or PBCH information (including initial system information, indication of selected multiplexing pattern, etc.).

Figure 9:
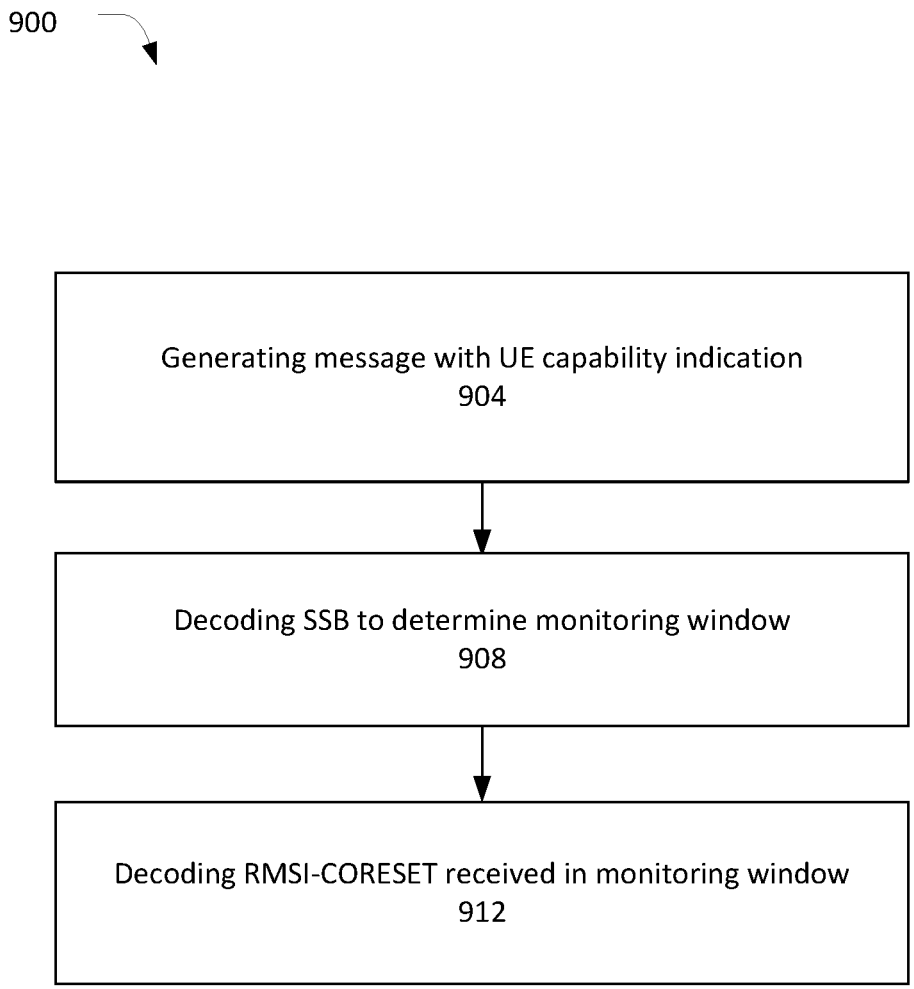
FIG. 9 illustrates an example operation flow/algorithmic structure in accordance with some embodiments.

FIG. 9 illustrates an operation flow/algorithmic structure 900 in accordance with some embodiments. The operation flow/algorithmic structure 900 may be performed by the UE 105 or components thereof. For example, the operation flow/algorithmic structure 900 may be performed by digital baseband circuitry 125 of the UE 105 described above with respect to FIG. 1.

The operation flow/algorithmic structure 900 may include, at 904, generating a message with a UE capability indication. The UE capability indication may provide an indication of monitoring capabilities of the UE. For example, the UE capability indication may indicate whether the UE is capable of monitoring Type 0/0A/1*/2 search spaces that are contiguous. As discussed above, the AN 110 may use this information to determine whether an RMSI-CORESET is placed before or after associated SSB. For example, if a UE is incapable of monitoring discontiguous search spaces, it may be advantageous to utilize the a multiplexing pattern in which only contiguous monitoring is needed (for example, the multiplexing pattern illustrated in FIG. 3).

The message with the UE capability indication may be sent to the AN 110 as part of a UE capability exchange.

The operation flow/algorithmic structure 900 may further include, at 908, decoding an SSB to determine a monitoring window. The monitoring window may be a time window in which the RMSI-CORESET associated with the SSB is to be received. In addition to providing information on the monitoring window, the SSB may provide further information to facilitate the detection and subsequent decoding of the RMSI-CORESET similar to that described above with respect to FIG. 8.

The operation flow/algorithmic structure 900 may further include, at 912, decoding an RMSI-CORESET received in the monitoring window.

Figure 10:
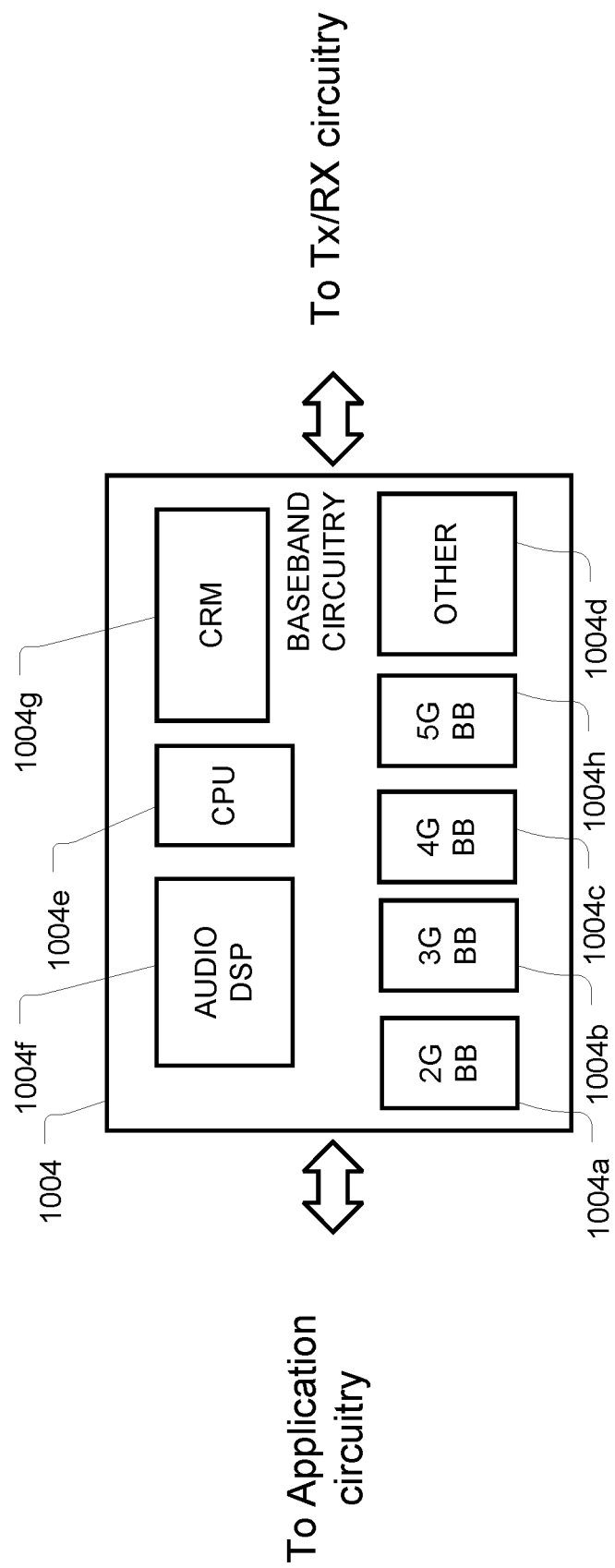
FIG. 10 illustrates baseband circuitry in accordance with some embodiments.

FIG. 10 illustrates baseband circuitry 1004 that may be implemented in the AN 110 or UE 105 in accordance with various embodiments. The baseband circuitry 1004 may be similar to, and substantially interchangeable with digital baseband circuitry 125 or 130 shown in FIG. 1. The baseband circuitry 1004 may interface with application circuitry (for example, protocol processing circuitry 115 or 120) and Tx/Rx circuitry (for example, transmit circuitry 135 or 140 or receive circuitry 145 or 150).

The baseband circuitry 1004 may include circuitry such as, but not limited to, one or more single-core or multi-core processors. The baseband circuitry 1004 may include one or more baseband processors or control logic to process baseband signals received from a receive signal path of receive circuitry and to generate baseband signals for transmit circuitry. Baseband processing circuitry 1004 may interface with the application circuitry for generation and processing of the baseband signals and for controlling operations of the Tx/Rx circuitry. For example, in some embodiments, the baseband circuitry 1004 may include a third generation (3G) baseband processor 1004A, a 4G baseband processor 1004B, a 5G baseband processor 1004C, or other baseband processor(s) 1004D for other existing generations, generations in development or to be developed in the future (e.g., second generation (2G), sixth generation (6G), etc.). The baseband circuitry 1004 (e.g., one or more of baseband processors 1004A-D) may handle various radio control functions that enable communication with one or more radio networks via the Tx/Rx circuitry. In other embodiments, some or all of the functionality of baseband processors 1004A-D may be included in modules stored in the memory 1004G and executed via a Central Processing Unit (CPU) 1004E. The radio control functions may include, but are not limited to, signal modulation/demodulation, encoding/decoding, radio frequency shifting, etc. In some embodiments, modulation/demodulation circuitry of the baseband circuitry 1004 may include Fast-Fourier Transform (FFT), precoding, or constellation mapping/demapping functionality. In some embodiments, encoding/decoding circuitry of the baseband circuitry 1004 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 1004 may include one or more audio digital signal processor(s) (DSP) 1004F. The audio DSP(s) 1004F may include elements for compression/decompression and echo cancellation and may include other suitable processing elements in other embodiments. Components of the baseband circuitry may be suitably combined in a single chip or a single chipset, or disposed on a same circuit board in some embodiments. In some embodiments, some or all of the constituent components of the baseband circuitry 1004 and the application circuitry may be implemented together such as, for example, on a system on a chip (SOC).

In some embodiments, the baseband circuitry 1004 may provide for communication compatible with one or more radio technologies. For example, in some embodiments, the baseband circuitry 1004 may support communication with an E-UTRAN or other WMAN, a WLAN, a WPAN. Embodiments in which the baseband circuitry 1004 is configured to support radio communications of more than one wireless protocol may be referred to as multi-mode baseband circuitry.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the Tx/Rx circuitry may include analog-to-digital converter (ADC) and digital-to-analog converter (DAC) circuitry and the baseband circuitry 1004 may include a digital baseband interface to communicate with the Tx/Rx circuitry.

Processors of the baseband circuitry 1004 (and application circuitry) may be used to execute elements of one or more instances of a protocol stack. For example, processors of the baseband circuitry 1004, alone or in combination, may be used execute Layer 3, Layer 2, or Layer 1 functionality, while processors of the application circuitry may utilize data (e.g., packet data) received from these layers and further execute Layer 4 functionality (e.g., TCP and UDP layers). As referred to herein, Layer 3 may comprise a RRC layer, described in further detail below. As referred to herein, Layer 2 may comprise a MAC layer, an RLC layer, and a PDCP layer, described in further detail below. As referred to herein, Layer 1 may comprise a PHY layer of a UE/RAN node, described in further detail below.

Figure 11:
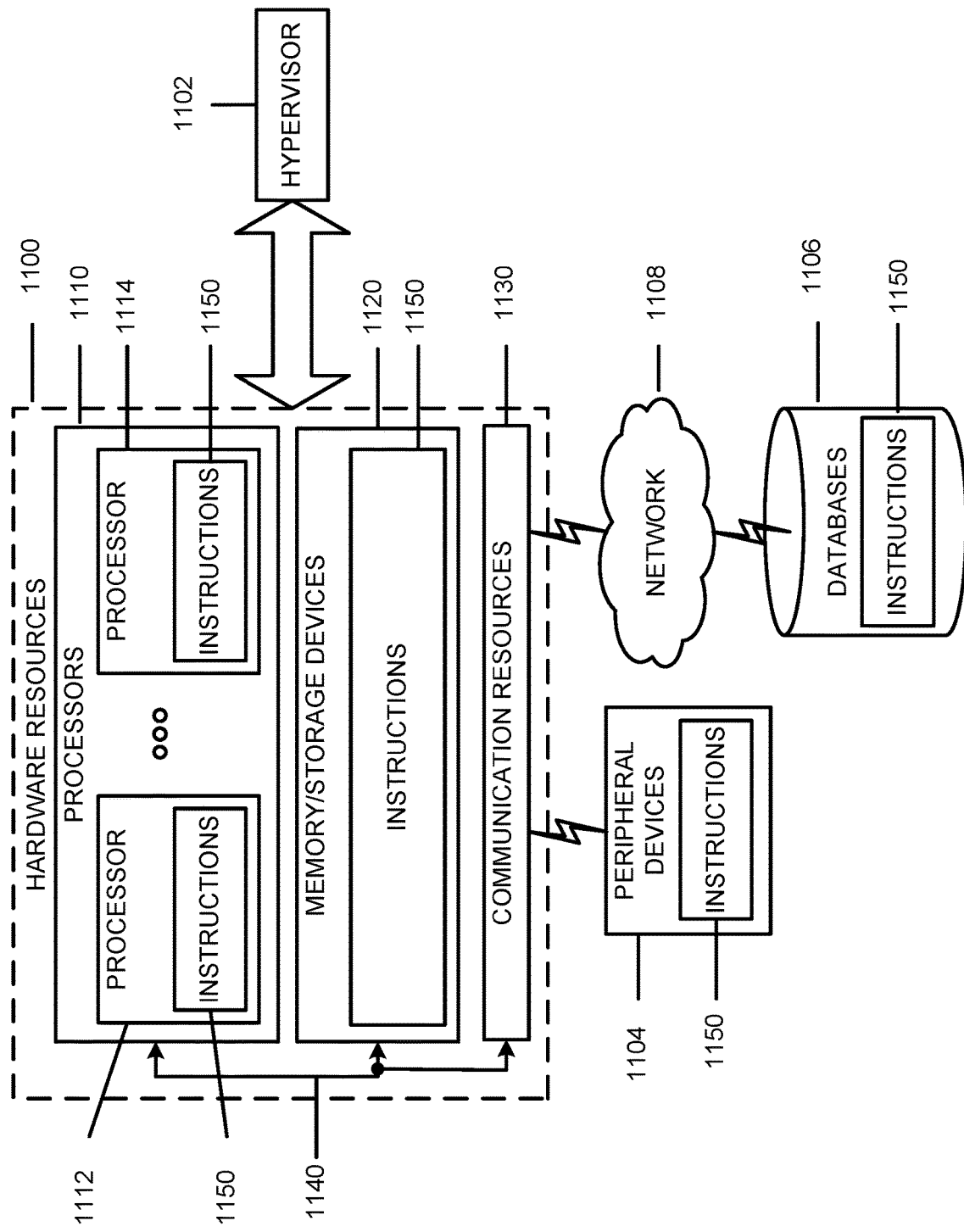
FIG. 11 illustrates components of an electronic device in accordance with some embodiments.

FIG. 11 is a block diagram illustrating components, according to some example embodiments, able to read instructions from a machine-readable or computer-readable medium (e.g., a non-transitory machine-readable storage medium) and perform any one or more of the methodologies discussed herein. Specifically, FIG. 11 shows a diagrammatic representation of hardware resources 1100 including one or more processors (or processor cores) 1110, one or more memory/storage devices 1120, and one or more communication resources 1130, each of which may be communicatively coupled via a bus 1140. As used herein, the term "computing resource," "hardware resource," etc., may refer to a physical or virtual device, a physical or virtual component within a computing environment, and/or a physical or virtual component within a particular device, such as computer devices, mechanical devices, memory space, processor/CPU time and/or processor/CPU usage, processor and accelerator loads, hardware time or usage, electrical power, input/output operations, ports or network sockets, channel/link allocation, throughput, memory usage, storage, network, database and applications, and/or the like. For embodiments where node virtualization (e.g., NFV) is utilized, a hypervisor 1102 may be executed to provide an execution environment for one or more network slices/sub-slices to utilize the hardware resources 1100. A "virtualized resource" may refer to compute, storage, and/or network resources provided by virtualization infrastructure to an application, device, system, etc.

The processors 1110 (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor 1112 and a processor 1114.

The memory/storage devices 1120 may include main memory, disk storage, or any suitable combination thereof. The memory/storage devices 1120 may include, but are not limited to, any type of volatile or nonvolatile memory such as dynamic random access memory (DRAM), static random access memory (SRAM), erasable programmable read-only memory (EPROM), electrically erasable programmable read-only memory (EEPROM), Flash memory, solid-state storage, etc.

The communication resources 1130 may include interconnection or network interface components or other suitable devices to communicate with one or more peripheral devices 1104 or one or more databases 1106 via a network 1108. For example, the communication resources 1130 may include wired communication components (e.g., for coupling via a universal serial bus (USB)), cellular communication components, NFC components, Bluetooth® components (e.g., Bluetooth® Low Energy), Wi-Fi® components, and other communication components. As used herein, the term "network resource" or "communication resource" may refer to computing resources that are accessible by computer devices via a communications network. The term "system resources" may refer to any kind of shared entities to provide services, and may include computing and/or network resources. System resources may be considered as a set of coherent functions, network data objects or services, accessible through a server where such system resources reside on a single host or multiple hosts and are clearly identifiable.

Instructions 1150 may comprise software, a program, an application, an applet, an app, or other executable code for causing at least any of the processors 1110 to perform any one or more of the methodologies discussed herein (for example, any of the SSB/RMSI-CORESET encoding/decoding methodologies described above). The instructions 1150 may reside, completely or partially, within at least one of the processors 1110 (e.g., within the processor's cache memory), the memory/storage devices 1120, or any suitable combination thereof. Furthermore, any portion of the instructions 1150 may be transferred to the hardware resources 1100 from any combination of the peripheral devices 1104 or the databases 1106. Accordingly, the memory of processors 1110, the memory/storage devices 1120, the peripheral devices 1104, and the databases 1106 are examples of computer-readable and machine-readable media.

For one or more embodiments, at least one of the components set forth in one or more of the preceding figures may be configured to perform one or more operations, techniques, processes, and/or methods as set forth in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

Some non-limiting examples are provided below.

Example 1 may include a method comprising: encoding a synchronization signal block (SSB) in a plurality of orthogonal frequency division multiplexing (OFDM) symbols in a slot; encoding remaining minimum system information-control resource set (RMSI-CORESET) that is associated with the SSB in a first OFDM symbol, wherein the first OFDM symbol is adjacent to the plurality of OFDM symbols; and transmitting the SSB using the plurality of OFDM symbols and the RMSI-CORESET using the first OFDM symbol.

Example 2 may include the method of example 1 or some other example herein, wherein the first OFDM symbol immediately follows the plurality of OFDM symbols.

Example 3 may include the method of example 1 or some other example herein, wherein the first OFDM symbol immediately precedes the plurality of OFDM symbols.

Example 4 may include the method of example 1 or some other example herein, wherein the SSB is a first SSB, the RMSI-CORESET is a first RMSI-CORESET, the plurality of OFDM symbols are a first plurality of OFDM symbols, the slot is a first slot, and the method further comprises: encoding a second SSB in a second OFDM symbol of a second slot; and encoding a second RMSI-CORESET in a second plurality of OFDM symbols of the second slot.

Example 5 may include the method of example 4 or some other example herein, wherein the second OFDM symbol is adjacent to the first OFDM symbol.

Example 6 may include the method of example 1 or some other example herein, further comprising encoding the SSB and the RMSI-CORESET according to a pattern that is to indicate whether the RMSI-CORESET is before or after the SSB.

Example 7 may include the method of example 6 or some other example herein, further comprising encoding the SSB with a physical broadcast channel (PBCH) payload that is to indicate the pattern.

Example 8 may include the method of example 1 or some other example herein, wherein the SSB is encoded with a 15 kHz subcarrier spacing or a 30 kHz subcarrier spacing.

Example 9 may include the method of example 1 or some other example herein, further comprising encoding a plurality of SSBs in one or more slots with an equal OFDM symbol spacing between successive SSBs.

Example 10 may include the method of example 9 or some other example herein, wherein the equal OFDM symbol spacing is three OFDM symbols.

Example 11 may include a method comprising: storing information on a plurality of multiplexing patterns in memory; decoding a physical broadcast channel (PBCH) payload to obtain an indication of a pattern selected from the plurality of multiplexing patterns stored in memory; and determining, based on the pattern, whether a remaining minimum system information-control resource set (RMSI-CORESET) is encoded within an orthogonal frequency division multiplexing (OFDM) symbol that immediately precedes or immediately follows OFDM symbols encoding a synchronization signal block (SSB) associated with the RMSI-CORESET; and decoding the RMSI-CORESET.

Example 12 may include the method of example 11 or some other example herein, further comprising determining the RMSI-CORESET is transmitted in an OFDM symbol that immediately precedes the SSB associated with the RMSI-CORESET.

Example 13 may include the method of example 11 or some other example herein, further comprising determining the RMSI-CORESET is transmitted in an OFDM symbol that immediately follows the SSB associated with the RMSI-CORESET.

Example 14 may include the method of example 11 or some other example herein, wherein decoding the RMSI-CORESET comprises determining a monitoring window based on the associated SSB.

Example 15 may include the method of example 11 or some other example herein, wherein the SSB is a first SSB, the RMSI-CORESET is a first RMSI-CORESET and the method further comprises: determining, based on the pattern, whether a second RMSI-CORESET is transmitted an OFDM symbol that immediately precedes or immediately follows a second SSB that is associated with the second RMSI-CORESET.

Example 16 may include the method of example 11 or some other example herein, wherein the first RMSI-CORESET is in a first OFDM symbol, the second RMSI-CORESET is in a second OFDM symbol, and the first and second OFDM symbols are adjacent to one another.

Example 17 may include a method comprising: generating a message to include an indication of whether the UE is capable of monitoring contiguous search spaces within a slot; decoding a synchronization signal block (SSB) to determine a monitoring window for remaining minimum system information (RMSI)-control resource set (CORESET); and decoding the RMSI-CORESET received in the monitoring window, wherein the RMSI-CORESET is adjacent to the SSB.

Example 18 may include the method of example 17 or some other example herein, wherein the SSB is transmitted by a plurality of orthogonal frequency division multiplexing (OFDM) symbols in the RMSI-CORESET is transmitted by a first OFDM symbol that is adjacent to the plurality of OFDM symbols.

Example 19 may include the method of example 17 or some other example herein, further comprising: determining, based on decoded SSB, a multiplexing pattern; and determining whether the RMSI-CORESET immediately precedes or immediately follows the SSB based on the multiplexing pattern.

Example 20 may include the method of example 17 or some other example herein, wherein the SSB is part of a discovery reference signal.

Example 21 may include an apparatus comprising means to perform one or more elements of a method described in or related to any of examples 1-20, or any other method or process described herein.

Example 22 may include one or more non-transitory computer-readable media comprising instructions to cause an electronic device, upon execution of the instructions by one or more processors of the electronic device, to perform one or more elements of a method described in or related to any of examples 1-20, or any other method or process described herein.

Example 23 may include an apparatus comprising logic, modules, and/or circuitry to perform one or more elements of a method described in or related to any of examples 1-20, or any other method or process described herein.

Example 24 may include a method, technique, or process as described in or related to any of examples 1-20, or portions or parts thereof.

Example 25 may include an apparatus comprising: one or more processors and one or more computer-readable media comprising instructions that, when executed by the one or more processors, cause the one or more processors to perform the method, techniques, or process as described in or related to any of examples 1-20, or portions thereof.

Example 26 may include a method of communicating in a wireless network as shown and described herein.

Example 27 may include a system for providing wireless communication as shown and described herein.

Example 28 may include a device for providing wireless communication as shown and described herein.

The description herein of illustrated implementations, including what is described in the Abstract, is not intended to be exhaustive or to limit the present disclosure to the precise forms disclosed. While specific implementations and examples are described herein for illustrative purposes, a variety of alternate or equivalent embodiments or implementations calculated to achieve the same purposes may be made in light of the above detailed description, without departing from the scope of the present disclosure, as those skilled in the relevant art will recognize.

What is claimed is:

1. One or more non-transitory, computer-readable media having instructions that, when executed, cause a device to:
   encode a first synchronization signal block (SSB) in a first plurality of orthogonal frequency division multiplexing (OFDM) symbols in a slot;
   encode a first remaining minimum system information-control resource set (RMSI-CORESET) that is associated with the first SSB in a first OFDM symbol, wherein the first OFDM symbol is adjacent to the first plurality of OFDM symbols;
   encode a second SSB in a second OFDM symbol of a second slot;
   encode a second RMSI-CORESET in a second plurality of OFDM symbols of the second slot; and
   transmit the SSB using the plurality of OFDM symbols and the RMSI-CORESET using the first OFDM symbol.

2. The one or more non-transitory, computer-readable media of claim 1, wherein the first OFDM symbol immediately follows the first plurality of OFDM symbols.

3. The one or more non-transitory, computer-readable media of claim 1, wherein the first OFDM symbol immediately precedes the first plurality of OFDM symbols.

4. The one or more non-transitory, computer-readable media of claim 1, wherein the second OFDM symbol is adjacent to the first OFDM symbol.

5. The one or more non-transitory, computer-readable media of claim 1, wherein the instructions, when executed, are to encode the first SSB and the first RMSI-CORESET according to a pattern that is to indicate whether the first RMSI-CORESET is before or after the first SSB.

6. The one or more non-transitory, computer-readable media of claim 5, wherein the instructions when executed are to encode the first SSB with a physical broadcast channel (PBCH) payload that is to indicate the pattern.

7. The one or more non-transitory, computer-readable media of claim 1, wherein the first SSB is encoded with a 15 kHz subcarrier spacing or a 30 kHz subcarrier spacing.

8. The one or more non-transitory, computer-readable media of claim 1, wherein the instructions, when executed, further cause the device to:

encode a plurality of SSBs in one or more slots with an equal OFDM symbol spacing between successive SSBs.

9. The one or more non-transitory, computer-readable media of claim 8, wherein the equal OFDM symbol spacing is three OFDM symbols.

10. An apparatus comprising:
memory to include information on a plurality of multiplexing patterns;
processing circuitry, coupled with the memory, the processing circuitry to:
decode a physical broadcast channel (PBCH) payload to obtain an indication of a pattern selected from the plurality of multiplexing patterns; and
determine, based on the pattern, whether a first remaining minimum system information-control resource set (RMSI-CORESET) is encoded within an orthogonal frequency division multiplexing (OFDM) symbol that immediately precedes or immediately follows OFDM symbols encoding a first synchronization signal block (SSB) associated with the first RMSI-CORESET;
determine, based on the pattern, whether a second RMSI-CORESET is encoded within an OFDM symbol that immediately precedes or immediately follows a second SSB that is associated with the second RMSI-CORESET; and
decode the first RMSI-CORESET.

11. The apparatus of claim 10, wherein the processing circuitry is further to determine the first RMSI-CORESET is transmitted in an OFDM symbol that immediately precedes the first SSB associated with the first RMSI-CORESET.

12. The apparatus of claim 10, wherein the processing circuitry is further to determine the first RMSI-CORESET is transmitted in an OFDM symbol that immediately follows the first SSB associated with the first RMSI-CORESET.

13. The apparatus of claim 10, wherein to decode the first RMSI-CORESET, the processing circuitry is to determine a monitoring window based on the associated first SSB.

14. The apparatus of claim 10, wherein the first RMSI-CORESET is in a first OFDM symbol, the second RMSI-CORESET is in a second OFDM symbol, and the first and second OFDM symbols are adjacent to one another.

15. One or more non-transitory, computer-readable media having instructions that, when executed, cause a user equipment (UE) to:
generate a message to include an indication of whether the UE is capable of monitoring contiguous search spaces within a slot;
decode a first synchronization signal block (SSB) to determine a first monitoring window for a first remaining minimum system information (RMSI)-control resource set (CORESET);
decode a second SSB to determine a second monitoring window for a second RMSI-CORESET; and
decode the first RMSI-CORESET received in the first monitoring window,
wherein the first RMSI-CORESET is adjacent to the first SSB.

16. The one or more non-transitory, computer-readable media of claim 15, wherein the first SSB is transmitted by a plurality of orthogonal frequency division multiplexing (OFDM) symbols and the first RMSI-CORESET is transmitted by a first OFDM symbol that is adjacent to the plurality of OFDM symbols.

17. The one or more non-transitory, computer-readable media of claim 15, wherein the instructions, when executed, further cause the UE to:
determine, based on decoded first SSB, a multiplexing pattern; and
determine whether the first RMSI-CORESET immediately precedes or immediately follows the first SSB based on the multiplexing pattern.

18. The one or more non-transitory, computer-readable media of claim 15, wherein the first SSB is part of a discovery reference signal.

* * * * *